United States Patent [19]

Champeau

[11] Patent Number: 4,493,535
[45] Date of Patent: Jan. 15, 1985

[54] HYBRID TRANSMISSIVE FOCALIZING OPTICAL SYSTEM

[76] Inventor: André Champeau, 7 Rue Puvis-de-Chavannes, 75017 Paris, France

[21] Appl. No.: 301,447

[22] Filed: Sep. 11, 1981

[30] Foreign Application Priority Data

Sep. 12, 1980 [FR] France ................................ 80 19768

[51] Int. Cl.³ ............................ G02B 3/08; G02B 5/22
[52] U.S. Cl. ..................................... 350/452; 350/440
[58] Field of Search ................. 350/452, 440; 126/440

[56] References Cited

U.S. PATENT DOCUMENTS 2,510,344  6/1950  Law ..................................... 350/452
3,628,854 12/1971  Jampolsky ........................... 350/452

FOREIGN PATENT DOCUMENTS 1663875  9/1953  Fed. Rep. of Germany ...... 350/452
2021807 12/1979  United Kingdom .
2042204  9/1980  United Kingdom ................ 350/452

*Primary Examiner*—John K. Corbin
*Assistant Examiner*—Rebecca D. Gass
*Attorney, Agent, or Firm*—Cushman, Darby & Cushman

[57] ABSTRACT

There is disclosed an optical system consisting in a floating assembly of a glass plate and of a focalizing part or lens out of plastic material, for instance a styrene-acrylonitril-copolymer, said focalizing part being stressless joined to said glass plate by an intermediary layer out of transparent material having a controlled viscosity, for instance silicone, the assembly being held joined by its peryphery by a frame structure with interposition of a resilient seal. A low concentration of anti-U.V. material is dispersed within the intermediary layer. Utilization more particularly for concentration solar energy in solar collecting systems.

9 Claims, 2 Drawing Figures

4,493,535

HYBRID TRANSMISSIVE FOCALIZING OPTICAL SYSTEM

BACKGROUND OF THE INVENTION

1. Field of the Invention

The present invention relates to hybrid transmissive focalizing optical systems, more particularly for utilization in collecting solar energy.

2. Description of the Prior Art

It has been recently proposed to realize lenses or lens members, more particularly of the Fresnel type, out of plastic material so as to avoid problems, particularly of weight, inherent to the glass lenses of medium or great dimensions.

Lenses out of methyl-polymethacrylate have shown excellent properties, despite transmission losses due to remaining geometrical defects resulting from the shrinking of the utilized material, but the price thereof remains excessively high. Hybrid optical systems have also been proposed which utilize a layer of glass forming a support and a layer of plastic material out of silicone resin forming the optically active focalizing part or lens. Said hybrid systems are also very expensive and exhibit problems of mechanical aspects over a long period of utilization at the level of the interface between the two adjoined parts.

OBJECTS OF THE INVENTION

There is an object of the invention to provide a transmissive focalizing hybrid optical system obviating said drawbacks, which is of low manufacturing cost and exhibits improved optical properties.

There is another object of the invention to provide such a system which is not subject to problems resulting from variations of the differential expansions or of the differential stresses in the constitutive elements of the system, whereby exhibiting an improved mechanical aspect as also a greatly improved resistance to the U.V. radiations.

BRIEF DESCRIPTION OF THE INVENTION

According to the invention, the transmissive focalizing hybrid optical system is comprised by an assembly of a supporting part out of glass and of a focalizing part out of plastic material, said latter being stressless joined to the glass part by an intermediary junction layer out of a semi-liquid transparent material having a controlled viscosity and having adhesive properties with respect to the glass and to the plastic material.

The invention thus provides a floating assembly which is maintained along the edges or periphery thereof by a frame with interposition of a resilient seal between said edges and said frame, whereby suppressing the problems resulting from a secured connection, such as for instance by bonding, between the different materials and due to the variations of the expansion factors and of the inner stresses in the constitutive parts of the assembly.

According to another feature of the invention, a anti-U.V. material is dispersed at a relatively weak concentration within the junction intermediary layer.

In such an arrangement, it is thus possible to utilize for the focalizing part a standard and cheap plastic material while suppressing the selection criteria directed to the mechanical aspect, since the glass part ensures the mechanical strength of the assembly, as also the criteria directed to resistance or ageing to the U.V. since ultra-violet radiations are absorbed over a wide range by the combination glass/anti-U.V. material in the intermediary layer, to thereby allow to choose the plastic material only in view of the intrinsic criteria thereof relating to the optical quality, the production costs and the workability.

It has already been proposed to include in plastic materials anti-U.V. compounds, but such a technique suffers two kinds of limitations: firstly, the concentration of the anti-U.V. material in the skin of the plate or of the lens out of a plastic material being very weak, the first microns of the incoming outer layer of said plastic member appears in fact as not protected, and secondly, the existing anti-U.V. materials do not provide an effective protection below 300 nanometers and thus allow passage of a range of wavelengths which may greatly affect both optical and mechanical properties of the plastic material.

In addition to the advantages as concerns the mechanical aspect, resulting from the floating arrangement of the assembly according to the invention, the invention further provides for a perfect complementarity between the filtration ability of the glass part and of the anti-U.V. material dispersed within the intermediary layer. Thus, ordinary glass normally cuts radiations below 320 nanometers; the range 320 to 400 nanometers is further efficiently cut by the intermediary layer including the anti-U.V. material. It is thus possible to utilize a current standard plastic material such as polystyren or styren-acrylonitril copolymers, the optical properties of which are satisfactory, whereby the sensitivity of said materials to the ultra-violet radiations may be ignored owing to the efficient filtering upsteram the focalizing part out of said plastic material.

The above and other objects and features of the invention will be apparent to those skilled in the art from the following detailed description and drawings, in which:

FIG. 1 is a schematic view showing in a transverse cross section an hybrid transmissive focalizing optical system according to the invention; and FIG. 2 is a graph showing transmission characteristics of such an optical system.

DETAILED DESCRIPTION OF THE DRAWINGS

Figure 1:
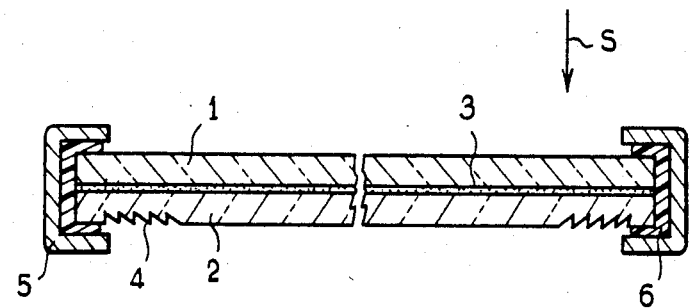

In FIG. 1 is illustrated an optical system according to the invention, which consists in a floating assembly of a glass support plate 1 and of a focalizing plate 2 out of plastic material which is stressless or floatingly joined face-to-face to the glass plate 1, i.e. which is maintained applied upon said latter, by an intermediary layer of reduced uniform thickness out of a liquid or semi-liquid transparent material having a controlled viscosity and exhibiting adhesive properties with respect to the glass and the plastic material of the focalizing plate 2. The glass plate 1 is arranged to be oriented towards the incoming solar radiation S, when the opposite face of the plate 2 out of plastic material is formed with indentations 4 to realize a lens, either circular, of the Fresnel type, or linear.

Typically, the focalizing plate 2 is made out of polystyrene or styrene-acrylonitril copolymer, but utilization can also be made of acrylic or silicone resins. The intermediary layer 3 is out of a material having a controlled viscosity chosen with respect to its superficial tension and to its adhesive properties with respect to the glass and the plastic material of the focalizing plate 2. In a practical embodiment, the intermediary layer is out of silicone, such as the two component silicone compound commercialized under the appellation RTV 132 by the SOCIETE INDUSTRIELLE DES SILICONES, a French corporation, the viscosity of which may be adjusted precisely. In another practical embodiment, the intermediary layer is made out of polyisobutylene, such as that commercialized under the appellation NX 20029 by NYCO S.A., a French corporation. Utilization can also be made of organic materials such as paraffinic derivates, some plasticizers, or liquid polymers, for instance polyolefins. The viscosity of the intermediary layer may be adjusted by incorporating therein at low concentrations a micro-powdered material, such as silica. The glass plate 1 is made out of a standard float glass. The glass plate 1 has a uniform thickness comprised between about 2 and 5 mm, when the minimum width of the focalizing plate 2, at the level of the root of the indentations 4, is comprised between 0.5 and 3 mm. The thickness of the intermediary layer 3 is determined depending on the constitutive material as utilized and is advantageously comprised between 2/100 and 15/100 mm, typically between 5 and 10/100 mm for the RTV 132 silicone. The optical assembly is held by a peripheral frame structure consisting of U-shaped sections 5 with interposition between the periphery of the composite optical system and the frame of a resilient seal 6, for instance out of the silicone, which is in turn advantageously realized in the form of U-shaped sections with wings extending over the peripheric outer faces of the optical assembly between said latter and the wings of the frame 5, as illustrated.

In the intermediary layer 3 is dispersed a substance which absorbs the ultra-violet radiations, for instance a benzotriazol such as that commercialized under the appelation TINUVIN 328 by CIBA-GEIGY Corp., or the anti-U.V. material classified under "A-type" and commercialized by the Société Francaise d'Organosynthése which is more particulary convenient when the intermediary layer is made out of polyisobutylene. Depending on the efficiency which is required for the anti-U.V. filtration, the concentration of said anti-U.V. material to the intermediary layer is comprised between 0.5 and 6% in weight, typically between 2 and 5%.

Figure 2:
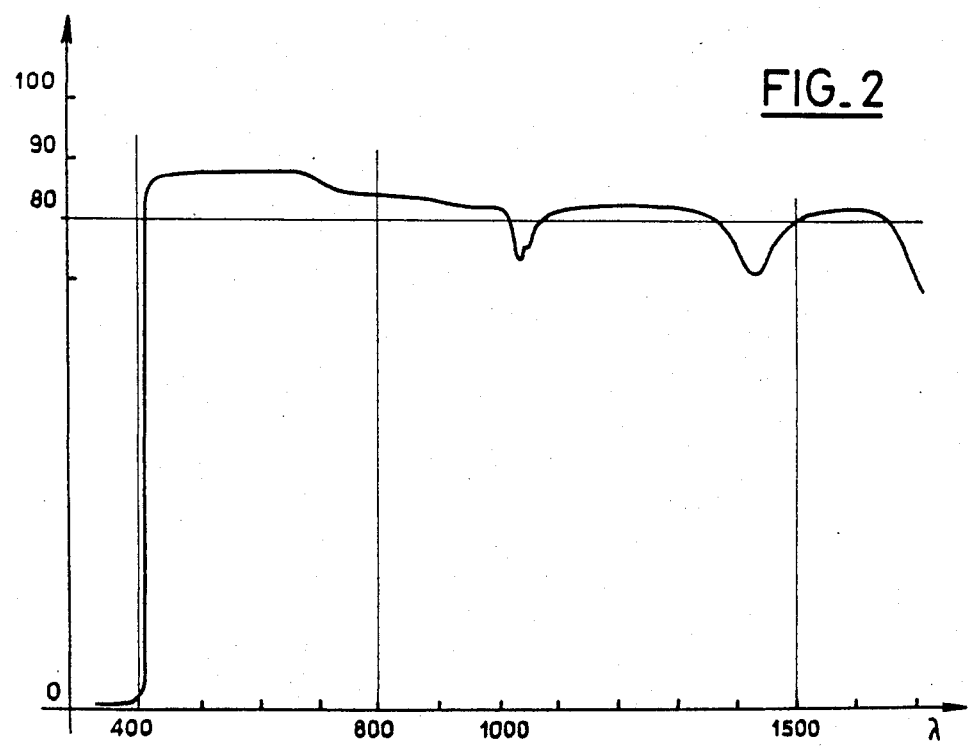

There is illustrated in FIG. 2 a transmission curve of a glass-silicon-SAN assembly according to the inventiion as related to the wave length in abcissae, the intermediary silicone layer including the anti-U.V. TINUVIN benzotriazol at a concentration of 2.5%. As illustrated, there is an efficient filtration of the radiation below 400 nanometers, which is realized, adjacent said limit value, by the anti-U.V. material in the intermediary layer. The transmission factor is greater than 85% over the visible range, said transmission factor in the near infra-red range being kept higher than an average of 80% up to beyond 1500 nanometers.

The performances of such an assembly are authorized by the possible reduction of the geometrical defects allowed by the weak shrinkage of the polystyrene or of the styrene-acrylonitril copolymer. The transmission factor may be kept adjacent 90% by submitting the outer surfaces of the optical system to a coating preventing trapped radiations from radiating back out, for instance by vacuum depositing a thin coating of magnesium fluoride, or by any other convenient technique. More particularly, the bottom indented face of the active part of the plastic lens may be provided with a deposited coating or a film of a plastic fluorinated resin such as FEP having a low refractive index of about 1,345, whereby the reflecting losses at the level of the output surface may be kept to a value lower than 2.20%.

Although the invention has been disclosed with reference to particular embodiments, it is to be understood that it is not limited to the specific constructions as illustrated and described, and is capable of extended applications and in advanced forms, and that the invention comprehends all constructions within the scope of the appended claims.

What I claim is:

1. A hybrid transmissive focalizing optical system for a solar generator comprising:
    a support part made of glass;
    a focalizing part of the Fresnel lens type of a plastic material chosen from the group consisting of the styrene homopolymers and copolymers;
    a frame structure provided at the periphery of said support part and focalizing part;
    an intermediary layer of a transparent material provided between said support part and focalizing part, said intermediary layer having a thixotropic structure imparting a controlled viscosity without flowing and having adhesive properties with respect to said glass support part and said focalizing part, said intermediary layer comprised of:
    a base material chosen from the group consisting of the silicones, polyolefines, paraffinic derivatives and the mixtures thereof, and
    a low concentration of a micro-powdered agent for adjusting the viscosity thereof,
    an ultraviolet absorbing substance in a concentration within the concentration of 0.5 to 6 percent by weight.

2. The optical system of claim 1, wherein said frame structure comprises frame members having a U-shaped cross section.

3. The optical system of claim 1, wherein said anti-U.V. material is a benzotriazol.

4. The optical system of claim 1 wherein at least one outer face of said focalizing optical system has an antireflecting coating.

5. The optical system of claim 1 wherein a resilient seal is interposed between said frame structure and the assembly comprising said support, said focalizing part and said transparent material.

6. The optical system of claim 1 wherein said micropowdered material is silica.

7. The optical system according to claim 1 wherein said intermediary layer has a substantially constant thickness comprised between about 2/100 and 15/100 mm.

8. The optical system according to claim 7, wherein said glass part is a plate having a substantially constant thickness comprised between 2 and 5 mm.

9. The optical system of claim 8, wherein said focalizing part has indentations formed on its face opposite said glass plate and has a minimum average local thickness at the level of the roots of said indentations comprised between 0.5 and 3 mm.

* * * * *